Sept. 8, 1964   V. SACCO   3,147,886
LIQUID PUMPING, DELIVERING AND METERING APPARATUS
Filed June 28, 1960   3 Sheets-Sheet 1

INVENTOR.
VICTOR SACCO
BY
ATTORNEYS

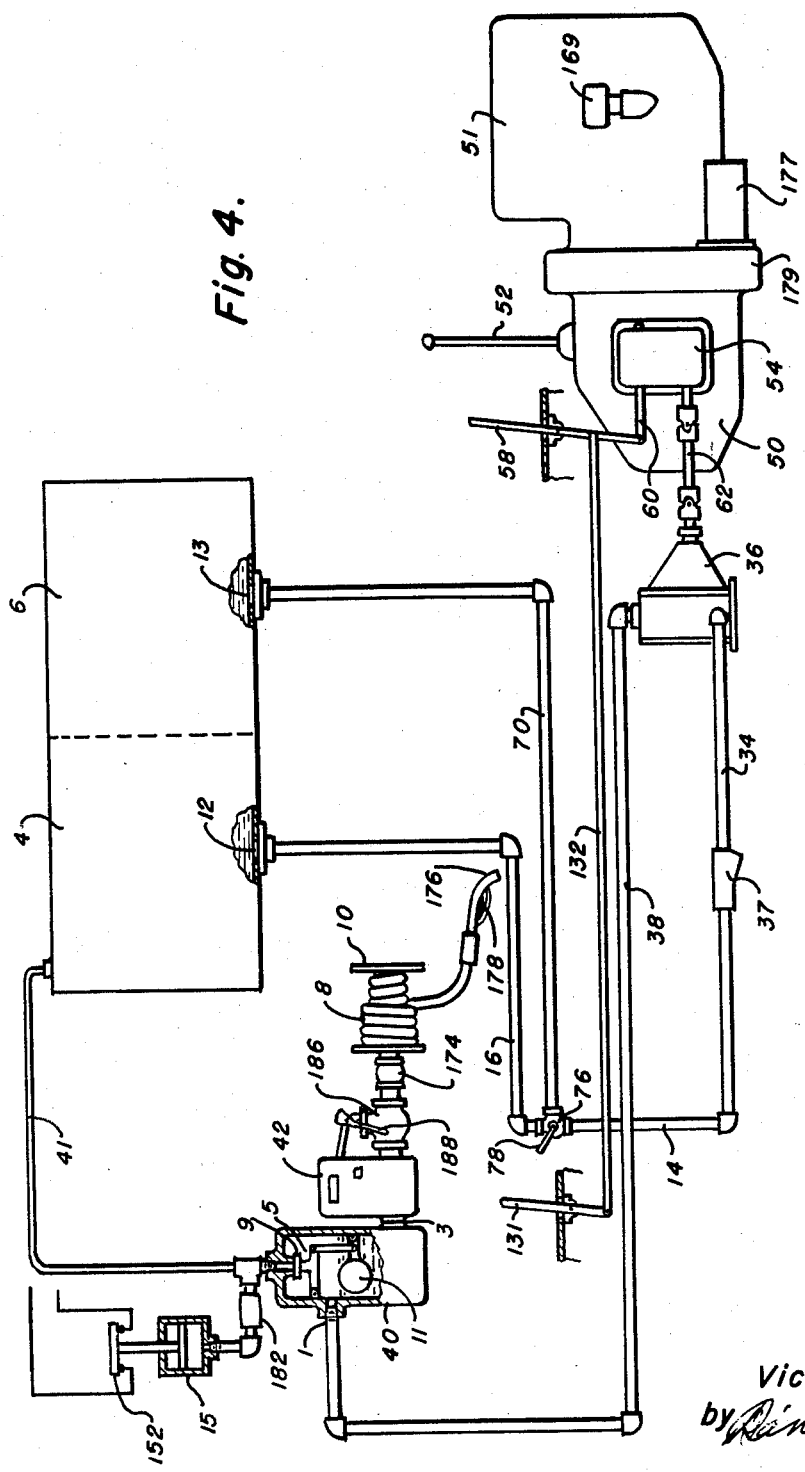

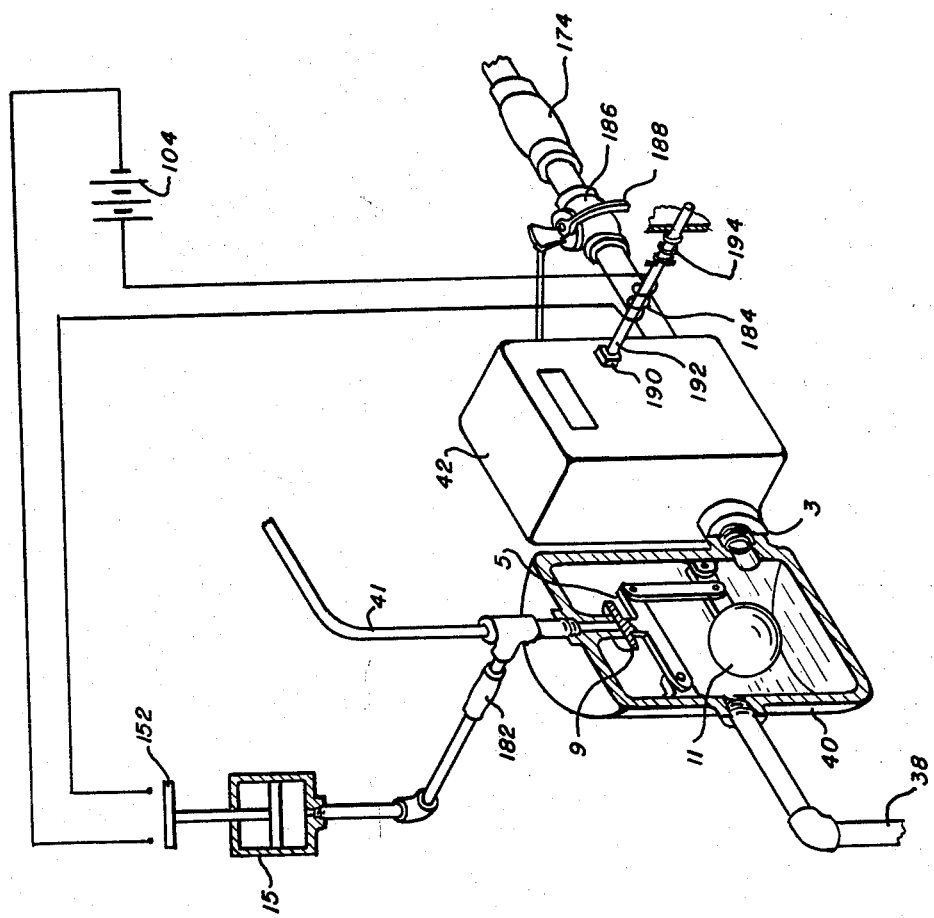

3,147,886
LIQUID PUMPING, DELIVERING AND
METERING APPARATUS
Victor Sacco, 265 Park Ave., Revere, Mass.., assignor of one-half to James Sacco, Saugus, Mass.
Filed June 28, 1960, Ser. No. 39,246)
16 Claims. (Cl. 222—23)

The present invention relates to apparatus for delivering liquid, such as oil, gasoline and the like, and metering the liquid so delivered. The invention relates particularly to apparatus of this character for delivering oil, gasoline or other liquid from tanks mounted on delivery trucks. From a more specific aspect, the invention relates to apparatus of this character embodying a pump for pumping the liquid, and in which it is desired to stop the operation of the pump when the tank becomes empty, or when the oil, gasoline or other liquid therein sinks to a predetermined level, even though the tank is not quite empty. The invention is not, however, restricted to pumping systems, and is applicable also to systems in which the liquid is delivered by gravity.

In a copending application, entitled "Liquid-Delivering-and-Metering Apparatus and Method," Serial No. 754,845, filed August 13, 1958, which matured, on April 18, 1961, into Letters Patent 2,980,294, there is disclosed a delivery truck upon which is mounted a tank having a plurality of compartments from which, in succession, oil, for example, is pumped into the storage tanks of householders and others, for use as fuel. The pump causes the oil to travel also through a meter, which meters the oil thus delivered into the storage tanks. When all or nearly all the oil becomes delivered from one of the tank compartments on the truck, however, and if the pump should continue its operation during the time required for the operator of the truck to disconnect from the empty tank compartment, and to reconnect to another tank compartment, air, instead of oil, may issue from the empty or nearly empty tank compartment. Traveling through the meter and into the storage tank, this air will produce a false reading or erroneous recording of the meter. There is danger of similar false metering occurring in the case of gravity delivering of oil. For brevity, the term erroneous recording will hereinafter be employed generically to designate such false metering.

It is customary to attempt to provide some protection for the meter against false or erroneous recordings by interposing an air release, separator or eliminator between the pump and the meter. The function of the air release, air separator, or air eliminator is theoretically to by-pass the air, before it reaches the meter. It is notorious, however, that the air release, separator or eliminator is not reliable, particularly under conditions where large quantities of air, at high velocities, are delivered, as occurs, for example, when the pump continues to pump out of an empty or nearly empty tank.

One well-known type of air release, separator or eliminator, for example, comprises a chamber having an inlet connected to the pressure side of the pump and an outlet connected to the meter. The chamber is provided with a valve disposed above the inlet and the outlet through which air therein is supposed to become eliminated through the action of gravity alone. The valve is normally closed by a float in the chamber, but opens when the liquid in the chamber falls below a predetermined level. Unfortunately, however, air entrained with the liquid pumped through the air release, separator or eliminator travels through the chamber and into the meter before it can escape through the valve thereabove. Control depending upon the level of the liquid in the chamber of the air eliminator, therefore, has been proved to be very unreliable, and air continues to pass through the meter.

The invention of the said Letters Patent is concerned more particularly with preventing such false or erroneous recordings of the meter. According to one form of the invention disclosed therein, this result is attained by causing valves automatically to close the outlets of the respective tank compartments as soon as they become respectively empty, or as soon as the oil therein sinks to predetermined levels, even though they be not quite empty. If the pump should thereafter be permitted to continue its pumping operation, the meter would record a false or erroneous recording or reading, despite the presence of the air release, separator or eliminator; and there is similar danger in the case of gravity feeds. Provision is therefore made for thereupon automatically terminating the operation of the pump; or, in the case of the gravity feed, otherwise to prevent a false or erroneous recording or reading of the meter. The pump may be stopped operating in any of a number of different ways. The preferred apparatus disclosed in the said Letters Patent comprises a by-pass chamber that is connected between the outlets of the tank compartments and the pump. As soon as the oil becomes fully pumped out of any particular tank compartment, or falls to the predetermined level, the valve closes the outlet of that particular tank compartment. Continued operation of the pump thereafter results in creating suction or a vacuum in the by-pass chamber. This suction is sufficient to actuate a switch, for example, or a piston in a cylinder, or other suitable mechanism. The switch, piston or other mechanism may be connected to gearing or other apparatus for thereupon promptly disconnecting the pump from its source of power. Further delivery, from the said particular tank compartment, through the meter, of any substantial amount of fluid, whether oil or air, becomes thereby prevented by thus immediately terminating the operation of the pump.

Great care must be exercised, however, in order so to design the apparatus that the valves that close the outlets of the tank compartments, upon these compartments becoming emptied or nearly emptied, shall not bind against their seats. It is found, in practice, nevertheless, that these valves have a tendency to bind so firmly against their seats that they will not automatically become dislodged when the tank compartments are refilled; and it thereupon becomes necessary, therefore, for some one to enter the tank, by way of its dome cover, in order manually to lift the valve from its seat.

The invention of the said Letters Patent was not the first to attempt ot solve this problem. Many of the proposed solutions, like the solution of the said Letters Patent, however, have suffered from the necessity for using valves or their equivalent.

An object of the present invention, accordingly, is to provide a new and improved apparatus of the above-described character.

A further object is to improve upon and simplify the apparatus disclosed in the said Letters Patent, with the ends in view of reducing the cost of manufacture, providing for easier installation, and, at the same time, improving the efficiency.

Other and further objects will be explained hereinafter, and will be more particularly pointed out in the appended claims.

With the above objects in view, a feature of the invention resides in dispensing altogether with all the valves of the various tank compartments, or their equivalent, and connecting the pump to a source of power from which it becomes automatically disconnected promptly by a pressure switch that is subjected to the pressure of the pump in the chamber of the air release or air eliminator. The pressure switch becomes subjected to the pressure of the pump, therefore, as soon as the air-eliminator valve becomes opened, responsive to the fall in the level of the liquid in the chamber of the air eliminator, resulting from the very fact that the pump has delivered to this chamber, not liquid, from a well-filled tank, but, on the contrary, air, from an empty tank. The meter is thus protected against erroneous recordings arising out of the delivery of air through the meter upon the tank compartments becoming empty, not, as described in the said Letters Patent, as a result of the closing of any tank-compartment valves, but rather in response to the lowered pressure in the air eliminator itself, resulting from the pump delivering air, instead of oil, thereto, from the now empty or nearly empty tank. Similar operation occurs in the case of gravity feed. In both cases, the protection of the meter, the prevention of delivering therethrough of any further fluid, whether liquid or air, from the empty or substantially empty tank, is brought about by a control from the air eliminator, responsive to the lowered air pressure therein.

The invention will now be more fully described in connection with the accompanying drawings, in which FIG. 1 is a side elevation, with parts broken away, and many other parts omitted, for clearness, of a truck on which is mounted an oil tank provided with one embodiment of the oil pumping, delivering, and metering apparatus of the present invention, the delivery being shown effected by means of a pump;

FIG. 4 is a schematic view of the embodiment of the invention illustrated by FIGS. 1, 2 and 3, many of the parts, however, being omitted, for clearness, from FIGS. 1, 2 and 3, being shown therein; and FIG. 5 is a view similar to FIG. 4 of a modification.

Figure 1:
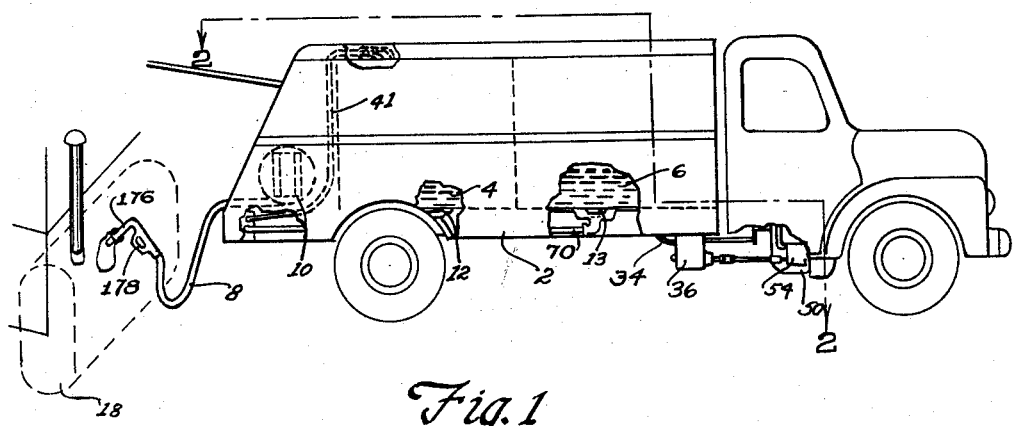

There is illustrated in the drawings herein, as in those of the said Letters Patent, a truck 2, upon which is mounted a tank comprising two tank compartments 4 and 6 for containing the liquid, assumed here, for definiteness, to be oil. The invention is equally applicable for use with only a single tank compartment 4, or with more than two tank compartments 4 and 6, but the two tank compartments 4 and 6 are illustrated herein for purposes of explanation of the invention. Each tank compartment may be provided with a vent, which may, for example, be positioned at its dome cover, not shown, for the entry of air thereinto during the delivery therefrom of the oil contained therein.

One end of a delivery hose 8, rolled upon a reel 10, may be connected, by mechanism more fully described hereinafter, to either the circular outlet 12, at the bottom of the tank compartment 4, or to a similar circular outlet 13, at the bottom of the tank compartment 6. For the present, it will suffice to say that the outlet 12, at the bottom of the compartment 4, is connected to a pipe 16, which constitutes a connection to the tank compartment 4, through which to deliver the oil therefrom. The connection pipe 16, in turn, is connected to a pipe 14. The nozzle valve 176 at the other end of the hose 8, under the control of a check or trigger lever 178, is shown in FIG. 1 emptying into a storage tank 18, for an oil burner, at the home of a householder.

Unlike the invention of the before-described Letters Patent, the outlets 12 and 13, at the bottom of the respective compartments 4 and 6, are always open. They are not provided with any valves for closing them when the respective tank compartments 4 and 6 become emptied.

The pipe 14 is shown connected, by a pipe connection 34, to a normally ineffective pump 36. The pump 36 is illustrated as of the rotary type. As is well known, it is desirable to keep air out of this type of pump, and to have it operate on liquids only. The volume of the pipe connection 34, which is shown diagrammatically, may be larger than is provided by a pipe. For definiteness, it may be referred to as a pump-connection chamber. A strainer, shown diagrammatically at 37, may be interposed in the pump-connection chamber 34, between the pipe 14 and the pump 36, for filtering out grit and other impurities from the oil.

The suction side of the pump 36 becomes thus connected to the outlet 12 by way of the connection pipes 34, 14 and 16. The pump 36 will therefore become effective, and will operate to deliver oil from the tank compartment 4, through the outlet 12 and by way of the connection pipes 16, 14 and 34, into a discharge or pressure pipe system 38, on the compression or pressure side of the pump 36. The pipe 38 is shown connected to a conventional air release, air separator or air eliminator 40 that is connected to a meter 42. The air eliminator 40 is thus interposed in the path of delivery of the liquid between the pump 36 and the meter 42, in order that the pump 36 may deliver the liquid from the tank compartment 4 first, through the air eliminator 40, and then, as it is delivered from the air eliminator 40, through the meter 42. A suitable meter, for example, is illustrated and described in Letters Patent 2,286,411, issued June 16, 1942, to Neptune Meter Company, as assignee of Charles S. Hazard. These meters are sold, on the market, with the air release, air separator, or air eliminator 40 annexed thereto, and also with a mechanism for stopping the operation of the meter at a predetermined setting of the meter.

As illustrated, the air release or air separator or air eliminator 40 may be connected to the air in the upper part of the compartment 4 by a vent-line pipe 41. The air release 40 is provided with an inlet 1, for connection to the outlet of the tank compartment 4 or 6, by way of the pipe system 38 and the pump 36, and an outlet 3, for connection to the inlet of the meter 42. It is provided also with a chamber 5, the upper portion of which has a valve 9. The air eliminator 40 and the meter 42 are thus connected in the path of delivery of the oil from the tank compartment 4 or 6, on the pressure side of the pump 36, in order that the oil may be delivered through the air eliminator 40 and the meter 42.

The valve 9 is under the control of a float 11 in the chamber 5. The float 11 is designed to close the valve 9 when the oil or other liquid in the chamber 5 of the air release 40 is at a sufficiently high predetermined level, and to open the valve 9 when this liquid drops below the predetermined level. Air in the chamber 5 will naturally rise to the upper portion of the chamber 5, and will escape through the valve 9, when open. The float 11 will drop also, opening the valve 9, when sufficient air accumulates in the chamber 5, above the liquid therein. In both cases, the valve 9, when open, will permit the air above the liquid in the chamber 5 to vent back into the compartment 4 by way of the vent-line pipe 41. The outlet of the meter 42 is connected to the first-named end of the hose 8.

It is in this manner that the oil may be delivered from the tank compartment 4, through the outlet 12, by way of the connection pipes 34, 14, 16 and 38, and through the air release 40 and the meter 42, into the householder's storage tank 18. By reason of this travel of the oil through the meter 42, during its delivery from the tank 4, the meter 42 becomes enabled to meter the oil delivered from the tank 4.

Figure 2:
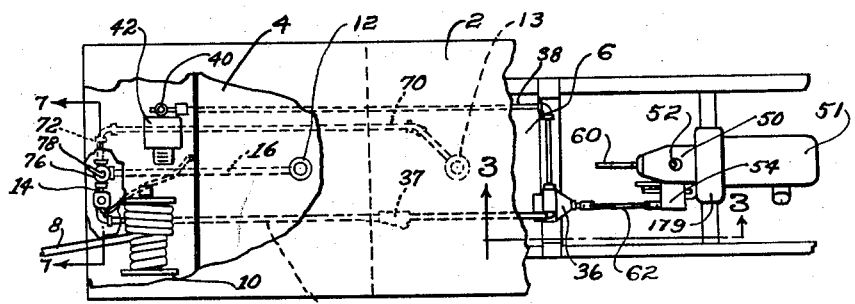
FIG. 2 is a horizontal section, taken upon the line 2—2 of FIG. 1, looking downward, in the direction of the arrows, additional parts being shown broken away.

Everything that has been described above in connection with the tank compartment 4 could equally well have been described in connection with the tank compartment 6. The outlet 13, in the bottom of the tank compartment 6, is shown connected to a pipe 70, which corresponds to the pipe 16, that is connected to the outlet 12 of the tank compartment 4. The pipe 70 is shown, in FIG. 2, connected to a pipe 72, in the same manner that the pipe 16 is shown connected to the pipe 14. In FIG. 4, however, the pipe 70 is, diagrammatically shown connected to the same pipe 14. The pipe 70 is therefore connected to the pipe 34, similarly to the connection thereto of the pipe 16.

By providing the two tank compartments 4 and 6, instead of only a single compartment 4, therefore, provision is made for connecting the pump 36 to the tank compartment 6 promptly after the compartment 4 has become emptied. It is desirable, however, that only one of the two tank compartments 4 and 6 be connected to the pump 36 at one and the same time.

This result may be attained by connecting both pipes 16 and 70, that are respectively connected to the respective outlets 12 and 13 of the tank compartments 4 and 6, to a single two-position manifold or plug or meter valve 76. By means of a manually operable handle 78, the two-position manifold valve 76 may be connected to either the pipe 16 or the pipe 70. These two positions may be described as the two open positions of the manifold valve 76. In one of these two open positions of the handle 78, the two-position manifold valve 76 connects the pump 36 to the pipe 16, and disconnects it from the pipe 70. In the other open position of the handle 78, the two position manifold or plug valve 76 connects the pump 36 to the pipe 70, and disconnects it from the pipe 16. Though there is also a third position of the manifold valve 76, in which it is closed, it will be convenient to refer to the manifold valve 76 as a two position valve, because it may occupy either of the two open positions.

As already stated, the function of the air release 40 is theoretically to keep air out of the meter 42, thereby to prevent a false or erroneous meter recording or reading. As also before stated, however, the air release 40 does not operate efficiently. After the compartment 4 or 6 empties, therefore, there is danger that false or erroneous recordings or readings will be obtained in the meter 42, caused by the air that the pump 36 continues to pump out of the empty or nearly substantially empty tank compartment 4 or 6, and through the meter 42. This difficulty, as before explained, is entirely overcome by the invention of the before-mentioned Letters Patent 2,980,294.

According to the present invention, however, this same result is attained without the aid of any valves for closing the openings 12 and 13. According to a feature of the present invention, provision is made for terminating the operation of the pump 36 as soon as the oil becomes all or nearly all or substantially pumped out from respective tank compartments 4 and 6. It therefore becomes impossible to deliver any further fluid, whether oil or air, through the meter 42 and it accordingly becomes impossible also to introduce any errors in reading or recording of the meter 42, such as, prior to the invention of the said Letters Patent 2,980,294, had theretofore been caused by the pump 36 pumping air out of the empty or substantially empty tank compartment 4 or 6. The same may occur when, instead of the oil becoming all pumped out of the compartment 4, it falls to a predetermined low level therein, as is also described in the said Letters Patent 2,980,294.

According to the present invention, this result is attained with the aid of a pressure device 15, shown as controlling a pressure switch 152. This pressure device 15 is omitted from FIGS. 1, 2 and 3, for clearness, but it is shown diagrammatically, in FIG. 4, connected to the valve 9 of the air eliminator 40.

It will be understood, of course, that the pressure device 15, like other mechanisms illustrated by the drawings, is shown only diagrammatically. A usable pressure device 15, for example, is the Type J6K, marketed by United Electric Controls Company, of Watertown, Massachusetts.

The operation of this pressure device 15 will be understood from the following description.

Assuming that, normally, the truck motor 50 and the pump 36 are ineffective, and that it is desired to start them operating, the driver of the truck 2 will close the truck switch, not shown, to start the truck motor 50. Though the truck motor 50 has thus been started, and is operating, the pump 36, however, is not yet operating. It may be set into operation as now to be described.

Figure 3:
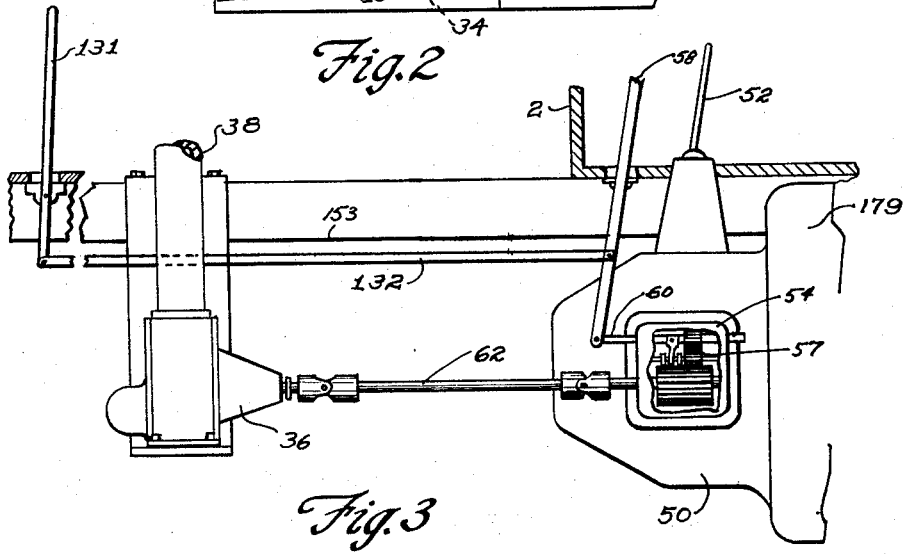
FIG. 3 is a fragmentary vertical longitudinal section, upon a larger scale, taken upon the line 3—3 of FIG. 2, looking upward in the direction of the arrows.

The motor 50 is shown provided with a power take-off 54, that may be connected, by connecting transmission gearing means 57, shown more particularly in FIG. 3, under the control of a power-take-off manually operated shift lever or handle 58 and a link mechanism 60. The pump 36 is shown connected to the gearing 57 by driving shafts and a universal joint, indicated generally at 62. The lever 58 may be connected, by a link 132, to a manually operated lever 131, at the rear of the truck. By shifting the lever 131 in opposite directions at the rear of the truck, therefore, it becomes possible to engage and disengage the power take-off 54 at the rear of the truck, the same as through the medium of the lever 58, at the front of the truck.

After the motor 50 has been set into operation, to drive the truck 2, by the lever 52, and the manipulation of the truck switch, therefore, the power-take-off lever 58 may be actuated to the left, as viewed in FIGS. 3 and 4, to connect the pump-operating gearing 57 to the motor drive, in order to set the pump 36 also into operation. The pump 36 will then start operating, to apply pressure to the pressure pipe system 38. It will not, at this time, pump any oil from either tank compartment 4 or 6 if the two-position manifold or plug valve 76 occupies its before-mentioned third or closed position, to which it has been actuated after the last previous delivery of oil.

As soon as the pump 36 builds up the pressure in the pipe 38 of the pressure system to a sufficiently high value, however, the manually operable handle 78 may be actuated to cause the two position valve 76, to occupy one or the other of its two open positions. This will result in connecting the hose 8 to the pressure of the system, by way of the pressure pipe 38.

The pump 36 will thereupon commence to pump oil out of the tank compartment 4 or 6, by way of the corresponding openings 12 and 13, and to the hose 8.

The pump 36 will continue to pump oil out of the compartment 4 or 6, as the case may be, until that compartment becomes entirely or nearly entirely or substantially emptied. The pump 36 will thereupon commence to pump air from that tank compartment. The pressure exerted by the pump 36 in the pressure system, represented by the pipe 38, will thereupon sink to a predetermined low value. The pump 36 will continue to pump fluid from that tank compartment through the pump pressure system 38, and through the air eliminator 40 and the meter 42, but at that low value of pressure. The level of the liquid in the chamber 5 of the air eliminator 40 will therefore fall, the float 11 will accordingly drop, and the valve 9 will open, subjecting the pressure device 15 to the pressure of the air in the chamber 5 of the air eliminator 40. The pressure device 15 will thereupon operate to cause the pressure switch 152 to open the circuit of the pump motor 50. The motor 50, of course, will then stop operating. Since the pump 36 is driven from this motor 50, through the gearing 57, the pump 36 will therefore also stop operating. It will therefore be impossible to pump further any substantial amount of fluid, whether oil or air, out of the emptied or substantially emptied tank compartment, through the meter 42, and the meter 42 will consequently not register any false or erroneous recordings or readings.

The setting of the pressure device 15 may be such as to stop the operation of the pump 36 when the tank compartment 4 or 6 to which it is connected becomes entirely emptied, or until the level of the oil in the tank compartment becomes lowered to a degree such that the pump 36 commences to deliver also a substantial amount of air from the tank compartment, even though the tank compartment is not entirely emptied. It will be observed further that it is in response to the thereupon consequent fall in the pressure exerted by the pump 36 on the pressure side of the pump that the motor 50 and the pump 36 connected thereto by the gearing 57 thereupon becomes disconnected from their source of power, thereby becoming rendered again ineffective.

To summarize the operation illustrated by FIGS. 1 to 4, inclusive, the driver of the truck first manipulates the truck switch and the lever 52 to start the operation of the truck motor 50. He then operates also the lever 58 or 131 to connect the pump 36, through the gearing 57, to the truck motor 50, whereupon the pump 36 will also start operating. The pressure in the pressure system 38 therefore commences to build up.

The driver will then actuate the lever 78 to cause the two-position valve 76 to assume one of its two before-described open positions. Oil will start to be delivered from the tank compartment 4 or the tank compartment 6, as the case may be, through the hose 8, into the storage tank 18. The pump 36 will continue thus to pump oil out of the compartment 4 or 6, as the case may be, until that compartment becomes entirely or nearly emptied, whereupon the pump 36 will commence to pump air from that tank compartment. The pressure exerted by the pump 36 in the pressure system 38 will therefore commence to sink.

The pump 36 will thereupon commence to pump air out of the tank compartment, whether or not mixed with oil, and, upon that air becoming delivered to the chamber 5 of the air eliminator 40, the level of the oil in that chamber 5 will sink below the predetermined level at which the float 11 is enabled to maintain the valve 9 of the air eliminator closed. This valve 9 will thereupon become opened, with the result that the pressure device 15 becomes subjected to the pressure in the air eliminator chamber 5. The pressure device 15 thereupon opens the circuit of the truck motor 50.

The pump 36, since it is driven from this motor 50, through the gearing 57, will also thereupon stop operating. It will not thereafter, therefore, pump any fluid, whether oil or air, out of the emptied or substantially emptied tank compartment, through the meter 42, and the meter will accordingly be protected against any readings or erroneous recordings.

As disclosed in the said Letters Patent 2,980,294, the invention may be practiced also, so as to prevent erroneous recordings of the meter, in a system in which the pump 36 is stopped operating when it starts pumping air out of the tank compartment 4 or 6, but without deenergizing the truck motor 50; and also in a gravity feed, without the use of any pump, at all. The pressure device 15 may also be connected so as to connect the meter 42 itself out of circuit, as is also disclosed in the said Letters Patent 2,980,294. A system of this kind is disclosed in FIG. 5.

In order that the operation of this FIG. 5 may be understood, it should now be stated that the meter 42 is provided with a conventional valve 186. The valve 186 may be opened by a hand-operated lever 188, and it closes automatically after the amount of oil has been delivered, through the hose 8, for which the meter 42 has been preset. There is shown also a pulsation absorber 182 and a conventional trip button 190 for shutting off the delivery of the oil at any time, at will.

According to the modification of the invention illustrated by FIG. 5, however, the trip button 190 may be operated also, as diagrammatically illustrated, by a core 192, which is illustrated as under the control of a spring 194 and a coil 184, which latter is illustrated as a solenoid.

Under normal conditions when no oil is being pumped, the spring 194 does not engage the trip button 190. At this time, the coil 184 is de-energized by reason of the fact that the switch 152 is open. A battery 104 is diagrammatically shown as a source of energy for energizing the coil 184.

Just as the pressure device 15, as described above, stops the pump 36, in the circuit of FIG. 4, so also it controls the operation of the coil 184, in the circuit of FIG. 5. In the system of this FIG. 5, it operates in response to a fall of pressure in the pressure system 38, to press the trip button 190, which thereupon causes the valve 186 to close.

In the system of this FIG. 5, therefore, the meter 42 is protected by closing the valve 186, under the control of the coil 184. It is therefore impossible to feed any further fluid through the meter 42, whether by means of a pump or in any other way.

Further modifications will occur to persons skilled in the art, and all such are considered to fall within the spirit and scope of the present invention, as defined in the appended claims.

What is claimed is:

1. Liquid pumping, delivering and metering apparatus comprising a tank for containing the liquid, a pump, means for connecting the suction side of the pump to the tank in order to cause the pump to deliver the liquid from the tank, a meter connected to the pressure side of the pump in order that the pump may deliver therethrough the liquid from the tank, an air eliminator comprising a chamber having an inlet connected to the pressure side of the pump and an outlet connected to the meter in order that the pump may deliver the liquid from the tank to and through the chamber prior to delivering it through the meter, the chamber being provided with a valve disposed above the inlet and the outlet through which air in the chamber may be eliminated and a float for closing the valve when the liquid delivered in the chamber by the pump from the tank is above a predetermined level, a pressure device connected to the valve, and means controlled by the pressure device upon the pressure device becoming subjected to the pressure of the air in the chamber when the valve is open for preventing the pump from delivering any further fluid from the tank through the meter, thereby to protect the meter against erroneous recordings arising out of the delivery by the pump of air through the meter.

2. Liquid pumping, delivering and metering apparatus comprising a tank for containing the liquid, a pump, means for connecting the suction side of the pump to the tank in order to cause the pump to deliver the liquid from the tank, means for connecting the pump to a source of power to operate the pump, an air eliminator and a meter connected to the pressure side of the pump in order that the pump may deliver therethrough the liquid from the tank, and means controlled by the pressure in the air eliminator when the liquid delivered to the air eliminator by the pump falls below a predetermined level for disconnecting the pump from the source of power.

3. Liquid pumping, delivering and metering apparatus comprising a tank for containing the liquid, a pump, means for connecting the suction side of the pump to the tank in order to cause the pump to deliver the liquid from the tank, means for connecting the pump to a source of power to operate the pump, an air eliminator and a meter connected to the pressure side of the pump in order that the pump may deliver therethrough the liquid from the tank, the eliminator having a chamber provided with a valve through which air therein may be eliminated and a float in the chamber for closing the valve when the liquid delivered in the chamber by the pump from the tank is above a predetermined level, a pressure device connected to the valve, and means controlled by the pressure device upon the pressure device becoming subjected to the pressure of the air in the chamber when the valve is open for disconnecting the pump from the source of power.

4. Liquid pumping, delivering and metering apparatus comprising a tank for containing the liquid, a pump, means for connecting the suction side of the pump to the tank in order to cause the pump to deliver the liquid from the tank, a meter connected to the pressure side of the pump in order that the pump may deliver therethrough the liquid from the tank, an air eliminator interposed in the path of delivery of the liquid between the pump and the meter in order that the pump may deliver the liquid from the tank first, through the air eliminator and then, as it is delivered from the air eliminator, through the meter, means operable in response to a predetermined low value of the pressure of the fluid delivered by the pump from the tank into the air eliminator resulting from the delivery by the pump of a substantial amount of air from the tank into the air eliminator for diverting the delivery of the liquid by the pump from the air eliminator away from the meter, and means whereby the diverting means is rendered ineffective to divert the delivery of the liquid away from the meter when the pressure of the fluid in the air eliminator is above the predetermined low value, whereby the meter is protected against erroneous recordings arising out of the delivery of air through the meter.

5. Liquid pumping, delivering and metering apparatus comprising a tank for containing the liquid, a pump, means for connecting the suction side of the pump to the tank in order to cause the pump to deliver the liquid from the tank, an air eliminator and a meter connected to the pressure side of the pump in order that the pump may deliver therethrough the liquid from the tank, the eliminator being provided with a valve through which, when open, air rising to the upper portion of the air eliminator above the level of the liquid therein may escape, means responsive to the pressure exerted in the air eliminator by the liquid as the liquid is delivered thereto from the tank for maintaining the valve closed, and means operable in response to a fall of pressure of the fluid in the air eliminator resulting from the delivery of a substantial amount of air from the tank into the air eliminator for opening the valve, in order to enable to escape through the valve the air delivered from the tank into the air eliminator, thereby to protect the meter against erroneous recordings arising out of the delivery of air through the meter.

6. Liquid pumping, delivering and metering apparatus comprising a tank for containing the liquid, a pump, means for connecting the suction side of the pump to the tank in order to cause the pump to deliver the liquid from the tank, an air eliminator and a meter connected to the pressure side of the pump in order that the pump may deliver therethrough the liquid from the tank, the eliminator being provided with a valve through which, when open, air rising to the upper portion of the air eliminator above the level of the liquid therein may escape, means responsive to the pressure exerted in the air eliminator by the liquid as the liquid is delivered thereto from the tank for maintaining the valve closed, and means operable in response to a fall of pressure of the fluid in the air eliminator resulting from the delivery of substantially all the liquid from the tank for opening the valve, in order to enable to escape through the valve the air delivered from the tank into the air eliminator, thereby to protect the meter against erroneous recordings arising out of the delivery of air through the meter.

7. Liquid pumping, delivering and metering apparatus comprising a tank for containing the liquid, a pump, means for connecting the suction side of the pump to the tank in order to cause the pump to deliver the liquid from the tank, means for connecting the pump to a source of power to operate the pump, an air eliminator and a meter connected to the pressure side of the pump in order that the pump may deliver therethrough the liquid from the tank, the eliminator being provided with a valve through which, when open, air rising to the upper portion of the air eliminator above the level of the liquid therein may escape, means responsive to the pressure exerted in the air eliminator by the liquid as the liquid is delivered thereto from the tank for maintaining the valve closed, and means operable in response to a fall of pressure of the fluid in the air eliminator resulting from the delivery of a substantial amount of air from the tank into the air eliminator for disconnecting the pump from the source of power, thereby to protect the meter against erroneous recordings arising out of the delivery of air through the meter.

8. Liquid pumping, delivering and metering apparatus comprising a tank for containing the liquid, a pump, means for connecting the suction side of the pump to the tank in order to cause the pump to deliver the liquid from the tank, an air eliminator and a meter connected to the pressure side of the pump in order that the pump may deliver therethrough the liquid from the tank, the eliminator having a chamber provided with a valve through which, when open, air rising to the upper portion of the chamber above the level of the liquid therein may escape, a float in the chamber, and means controlled by the float for closing the valve when the liquid in the chamber is above a predetermined level and for opening the valve upon the level of the liquid in the chamber falling below the predetermined level in response to a fall of pressure of the fluid in the chamber resulting from the delivery of a substantial amount of air from the tank into the chamber, in order to enable to escape through the valve the air delivered from the tank into the chamber, thereby to protect the meter against erroneous recordings arising out of the delivery of air through the meter.

9. Liquid pumping, delivering and metering apparatus comprising a tank for containing the liquid, a pump, means for connecting the suction side of the pump to the tank in order to cause the pump to deliver the liquid from the tank, an air eliminator and a meter connected to the pressure side of the pump in order that pump may deliver therethrough the liquid from the tank, the eliminator having a chamber provided with a valve through which, when open, air rising to the upper portion of the chamber above the level of the liquid therein may escape, a float in the chamber, and means controlled by the float for closing the valve when the liquid in the chamber is above a predetermined level, a pressure device connected to the valve, and means controlled by the pressure device upon the pressure device becoming subjected to the pressure of the air in the chamber when the valve is open for preventing the pump from delivering any further fluid from the tank through the meter, thereby to protect the meter against erroneous recordings arising out of the delivery of air through the meter.

10. Liquid pumping, delivering and metering apparatus comprising a tank for containing the liquid, a pump, means for connecting the suction side of the pump to the tank in order to cause the pump to deliver the liquid from the tank, means for connecting the pump to a source of power to operate the pump, an air eliminator and a meter connected to the pressure side of the pump in order that the pump may deliver therethrough the liquid from the tank, the eliminator having a chamber provided with a valve through which, when open, air rising to the upper portion of the chamber above the level of the liquid therein may escape and a float in the chamber, and means controlled by the float for closing the valve when the liquid in the chamber is above a predetermined level, a pressure device connected to the valve, and means controlled by the pressure device upon the pressure device becoming subjected to the pressure of the air in the chamber when the valve is open for disconnecting the pump from the source of power, thereby to protect the meter against erroneous recordings arising out of the delivery of air through the meter.

11. Liquid delivering and metering apparatus comprising a tank for containing the liquid, an air eliminator, a meter, a normally closed valve, means whereby the liquid may be delivered from the tank to and through the air eliminator, the meter and the valve when the valve is open, means for manually opening the valve, and means controlled by the pressure of the fluid delivered from the tank into the air eliminator upon such pressure falling to a predetermined low value resulting from the delivery of a substantial amount of air from the tank for reclosing the valve to prevent the delivery of any substantial further amount of fluid from the tank through the meter, thereby to protect the meter against erroneous recordings arising out of the delivery of air through the meter.

12. Liquid pumping, delivering and metering apparatus comprising a tank for containing the liquid, a pump, means for connecting the suction side of the pump to the tank in order to cause the pump to deliver the liquid from the tank, a meter and a normally closed valve connected to the pressure side of the pump in order that the pump may deliver therethrough the liquid from the tank when the valve is open, means for manually opening the valve, a pressure device responsive to a given low value of pressure for closing the valve, an air eliminator interposed in the path of delivery of the liquid between the pump, the meter and the valve in order that the pump may deliver the liquid from the tank through the air eliminator, the meter and the valve when the valve is open until it commences to deliver air from the tank in the amount which decreases the pressure in the eliminator to said low value, and means for subjecting the pressure device to the said low value of the pressure in the eliminator for thereupon reclosing the valve to prevent the delivery of any substantial further amount of fluid from the tank through the meter, thereby to protect the meter against erroneous recordings arising out of the delivery of air through the meter.

13. Liquid delivering and metering apparatus comprising a tank for containing the liquid, an air eliminator, a meter, a normally closed valve, means for manually opening the valve, a pressure device responsive to a given low value of pressure external to the eliminator for closing the valve, means whereby the liquid may be delivered from the tank to and through the eliminator, the meter and the valve when the valve is open until air in the amount which decreases the pressure in said eliminator to said low value commences to be delivered from the tank into the eliminator, and means for subjecting the pressure device to the said low value of the pressure in the eliminator for thereupon reclosing the valve to prevent the delivery of any substantial further amount of fluid from the tank through the meter, thereby to protect the meter against erroneous recordings arising out of the delivery of air through the meter.

14. Liquid delivering and metering apparatus comprising a tank for containing the liquid, a meter provided with an air eliminator and a normally closed valve disposed adjacent to the meter, a delivery hose one end of which is connected to the meter and the valve, a nozzle valve connected to the other end of the delivery hose, means whereby the liquid may be delivered from the tank along a path to and through the meter and the meter valve and the delivery hose when the meter valve is open, means for opening the meter valve, means responsive to the pressure exerted by the liquid as the liquid is delivered from the tank for maintaining the meter valve open, thereby to permit the delivery of the liquid from the tank along the path to and through the meter and the meter valve and the delivery hose, and means for reclosing the meter valve in response to the liquid becoming delivered from the tank to a degree such that a substantial amount of air commences to be delivered from the tank, in order to prevent the delivery of any further fluid from the tank along the path to and through the meter, thereby to protect the meter against erroneous recordings arising out of the delivery of air through the meter.

15. Liquid delivering and metering apparatus comprising a tank for containing the liquid, a meter provided with an air eliminator and a normally closed valve disposed adjacent to the meter, a delivery hose one end of which is connected to the meter and the valve, a nozzle valve connected to the other end of the delivery hose, a pump, means for connecting the suction side of the pump to the tank and the pressure side of the pump to the meter, the meter valve and the said one end of the delivery hose in order to cause the pump to deliver the liquid from the tank along a path to and through the meter and the meter valve and the delivery hose when the meter valve is open, means for opening the meter valve, means responsive to the pressure exerted by the liquid as the liquid is delivered from the tank for maintaining the meter valve open, thereby to permit the pump to deliver the liquid from the tank along the path to and through the meter and the meter valve and the delivery hose, and means for reclosing the meter valve in response to the liquid becoming delivered by the pump from the tank to a degree such that it commences to deliver a substantial amount of air from the tank, in order to prevent the delivery by the pump of any further fluid from the tank along the path to and through the meter, thereby to protect the meter against erroneous recordings arising out of the delivery of air through the meter.

16. Liquid delivering and metering apparatus comprising a tank having two compartments for containing the liquid, a two-position valve for connection to one of the compartments and disconnection from the other compartment in one of its positions and for connection to the said other compartment and disconnection from the said one compartment in its other position, a meter provided with an air eliminator and a normally closed meter valve disposed adjacent to the meter, a delivery hose one end of which is connected to the meter and the valve, a nozzle valve connected to the other end of the delivery hose, means whereby, when the meter valve is open, the liquid may be delivered from one only of the compartments along a path to and through the meter and the meter valve and the delivery hose when the two-position valve occupies one of its two positions and from the other compartment only along a path to and through the meter and the meter valve when the two-position valve occupies the other of its two positions, means for manually opening the meter valve, means responsive to the pressure exerted by the liquid as the liquid is delivered from the respective compartments for maintaining the meter valve open, thereby to permit the delivery of the liquid from the respective compartments along the respective paths to and through the meter and the meter valve and the delivery hose, and means for reclosing the meter valve in response to the liquid becoming delivered from the tank to a degree such that a substantial amount of air commences to be delivered from the respective compartments, in order to prevent the delivery of any further fluid from the respective compartments along the respective paths to and through the meter, thereby to protect the meter against erroneous recordings arising out of the delivery of air through the meter.

References Cited in the file of this patent

UNITED STATES PATENTS

| | | |
|---|---|---|
| 1,707,657 | Douglas | Apr. 2, 1929 |
| 1,816,821 | Basset | Aug. 4, 1931 |
| 1,903,332 | Bellar et al. | Apr. 4, 1933 |
| 1,981,507 | Harris et al. | Nov. 20, 1934 |
| 2,011,393 | Bradley | Aug. 13, 1935 |
| 2,075,126 | Marden | Mar. 20, 1937 |
| 2,258,636 | Young et al. | Oct. 14, 1941 |
| 2,276,839 | Grise | Mar. 17, 1942 |
| 2,330,703 | Grise | Sept. 28, 1943 |
| 3,004,549 | Temple | Oct. 17, 1961 |